(12) United States Patent
Call et al.

(10) Patent No.: US 10,108,753 B2
(45) Date of Patent: Oct. 23, 2018

(54) LAMINATE SUBSTRATE THERMAL WARPAGE PREDICTION FOR DESIGNING A LAMINATE SUBSTRATE

(71) Applicant: International Business Machines Corporation, Armonk, NY (US)

(72) Inventors: Anson J. Call, Poughkeepsie, NY (US); Vijayeshwar D. Khanna, Millwood, NY (US); David J. Russell, Owego, NY (US); Krishna R. Tunga, Wappiners Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 15/176,101

(22) Filed: Jun. 7, 2016

(65) Prior Publication Data
US 2017/0351783 A1    Dec. 7, 2017

(51) Int. Cl.
*G06F 17/50* (2006.01)

(52) U.S. Cl.
CPC .................. *G06F 17/50* (2013.01)

(58) Field of Classification Search
CPC ............................ G06F 17/50; G06F 17/5018
USPC ............................................. 703/1, 2
See application file for complete search history.

(56) References Cited

U.S. PATENT DOCUMENTS

| | | |
|---|---|---|
| 5,888,630 A | 3/1999 | Sylvester et al. |
| 7,139,678 B2 | 11/2006 | Kobayashi et al. |
| 7,239,013 B2 * | 7/2007 | Shimada ................ H05K 1/162 257/664 |
| 7,260,806 B2 | 8/2007 | Fukuzono et al. |
| 7,873,932 B2 | 1/2011 | Kakino et al. |
| 7,996,196 B2 | 8/2011 | Mizutani et al. |
| 8,352,230 B2 * | 1/2013 | Kim ................... G06F 17/5018 703/13 |
| 8,392,167 B2 | 3/2013 | Hirata |
| 2014/0027163 A1 * | 1/2014 | Min ..................... H05K 1/0271 174/257 |

(Continued)

OTHER PUBLICATIONS

K. Macurova et al., "Simulation of stress distribution in assembled silicon dies and deflection of printed circuit boards", 15th International Conference on Thermal, Mechanical and Multi-Physics Simulation and Experiments in Microelectronics and Microsystems (EUROSIME), 2014, 7 pages.

*Primary Examiner* — Andy Ho
(74) *Attorney, Agent, or Firm* — Law Offices of Ira D. Blecker, P.C.

(57) ABSTRACT

Method of designing a laminate substrate having upper laminate layers and an equal plurality of lower laminate layers including: dividing the laminate substrate into regions having corresponding laminate layer pairs consisting of an upper laminate layer and a lower laminate layer; calculating a net stretching value for each corresponding laminate layer pair in each region to result in net stretching values in each region; summing the net stretching values in each region to result in a net stretching value for each region proportional to a curvature of each local region; calculating a relative out-of-plane displacement for the laminate substrate from the curvature of each local region; calculating a predicted thermal warpage for the laminate substrate; and finalizing a design of the laminate substrate when the predicted thermal warpage is within a predetermined acceptable range.

20 Claims, 5 Drawing Sheets

(56) References Cited

U.S. PATENT DOCUMENTS

2014/0268603 A1    9/2014   Hoffmeyer et al.
2014/0310677 A1   10/2014   Nakadate et al.
2015/0248516 A1    9/2015   Hada et al.

* cited by examiner

LAMINATE SUBSTRATE THERMAL WARPAGE PREDICTION FOR DESIGNING A LAMINATE SUBSTRATE

BACKGROUND

The present exemplary embodiments pertain to predicting thermal warpage of an organic laminate substrate and more particularly predicting thermal warpage using the metallic design pattern in the laminate substrate to design a laminate substrate.

An organic laminate substrate, often referred to also as a printed wiring board, is assembled by stacking layers of substrate materials. The materials from which each of these layers are formed may be quite diverse, some layers for instance being metal, such as copper, while other layers may be nonmetallic and made from materials such as an epoxy resin and glass or fiberglass fibers. The coefficient of thermal expansion (CTE) for these individual layers may be considerably different which may invite a thermally induced substrate surface distortion, hereafter referred to as thermal warpage.

A high degree of flatness is expected for manufactured organic laminate substrates in order to reduce, for example, connection failures when mounting components such as chips on the organic laminate substrate. Reducing thermal warpage is important to the design of the organic laminate substrate and assembly process of mounting components on the organic laminate substrate. Thermal warpage of the bare organic laminate substrate may be one of the important metrics that governs the yield of the component/organic laminate substrate process.

BRIEF SUMMARY

The various advantages and purposes of the exemplary embodiments as described above and hereafter are achieved by providing, according to an aspect of the exemplary embodiments, a computer-implemented method of designing of a laminate substrate having a core, a plurality of laminate layers above the core and a plurality of laminate layers below the core, the method comprising: dividing the laminate substrate into a plurality of regions, each region having a plurality of corresponding laminate layer pairs consisting of a laminate layer above the core and a laminate layer below the core; calculating a net stretching value for each corresponding laminate layer pair in each region to result in a plurality of net stretching values in each region; summing the plurality of net stretching values in each region to result in a net stretching value for each region wherein the net stretching value in each region is proportional to a curvature of each local region; calculating a relative out-of-plane displacement for the laminate substrate from the curvature of each local region; calculating a predicted thermal warpage for the laminate substrate such that the predicted thermal warpage is proportional to the relative out-of-plane displacement divided by a thickness of the core raised to an exponent; and finalizing a design of the laminate substrate when the predicted thermal warpage is within a predetermined acceptable range.

According to another aspect of the exemplary embodiments, there is provided a computer-implemented method of designing a laminate substrate having a plurality of upper laminate layers and an equal plurality of lower laminate layers, the method comprising: dividing the laminate substrate into a plurality of regions, each region having a plurality of corresponding laminate layer pairs consisting of an upper laminate layer and a lower laminate layer; calculating a net stretching value for each corresponding laminate layer pair in each region to result in a plurality of net stretching values in each region; summing the plurality of net stretching values in each region to result in a net stretching value for each region wherein the net stretching value in each region is proportional to a curvature of each local region; calculating a relative out-of-plane displacement for the laminate substrate from the curvature of each local region; calculating a predicted thermal warpage for the laminate substrate such that the predicted thermal warpage is proportional to the relative out-of-plane displacement divided by a thickness of a core raised to an exponent wherein the core is optional and when the core is not present, then the number 1 is substituted for the thickness of the core; and finalizing a design of the laminate substrate when the predicted thermal warpage is within a predetermined acceptable range.

According to a further aspect of the exemplary embodiments, there is provided a computer program product for designing a laminate substrate having a plurality of upper laminate layers and an equal plurality of lower laminate layers, the computer program product comprising a computer readable storage medium having program instructions embodied therewith, the program instructions executable by a processor to cause the processor to perform a method comprising: dividing the laminate substrate into a plurality of regions, each region having a plurality of corresponding laminate layer pairs consisting of an upper laminate layer and a lower laminate layer; calculating a net stretching value for each corresponding laminate layer pair in each region to result in a plurality of net stretching values in each region; summing the plurality of net stretching values in each region to result in a net stretching value for each region wherein the net stretching value in each region is proportional to a curvature of each local region; calculating a relative out-of-plane displacement for the laminate substrate from the curvature of each local region; calculating a predicted thermal warpage for the laminate substrate such that the predicted thermal warpage is proportional to the relative out-of-plane displacement divided by a thickness of a core raised to an exponent wherein the core is optional and when the core is not present, then the number 1 is substituted for the thickness of the core; and finalizing a design of the laminate substrate when the predicted thermal warpage is within a predetermined acceptable range.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 2 to 4 illustrate the exemplary embodiments in which the laminate substrate is divided into local regions wherein:

FIG. 2 is a cross sectional view that illustrates each laminate layer in the local region having a stretching component;

FIG. 3 is a cross sectional view that illustrates a net stretching component for each corresponding pair of laminate layers; and FIG. 4 is a cross sectional view that illustrates a net stretching component for the entire local region.

DETAILED DESCRIPTION

The exemplary embodiments pertain to a method to predict the thermal warpage during the design of the organic laminate substrate (hereafter just laminate substrate) that may improve the design of the organic laminate substrate, may reduce manufacturing cost and help in increasing yields of the component/laminate substrate assembly process.

Prior methods used average copper loading within each laminate layer to predict thermal warpage. The actual design pattern within each laminate layer is not taken into consideration in these prior methods.

The exemplary embodiments take into account the exact copper design pattern within each laminate layer and not the average copper loading within each laminate layer to predict thermal warpage. In looking at the exact copper design pattern, the exemplary embodiments offer more accurate predictability of thermal warpage compared to the prior methods, thereby improving the design of the laminate substrate. Further, the exemplary embodiments are not dependent on material property assumptions as is the case with many simulation/modeling techniques that have been used in the past.

The exemplary embodiments make the following assumptions:

For a given laminate material, thermal warpage may be primarily caused due to copper design pattern differences between various build-up laminate layers present in the laminate.

Thermal warpage could exist for zero copper imbalance. This thermal warpage may be due to residual stresses during laminate fabrication or due to cure shrinkage. The effect of the residual stresses on thermal warpage is secondary and is constant for a given laminate material.

At any given point on the laminate surface, differences in copper design patterns between various laminate layers in a local region around a given point may cause local stretching/compression (or local strain).

The combination of localized stretching (or compression) across all regions on the laminate surface may cause warpage.

Figure 1:
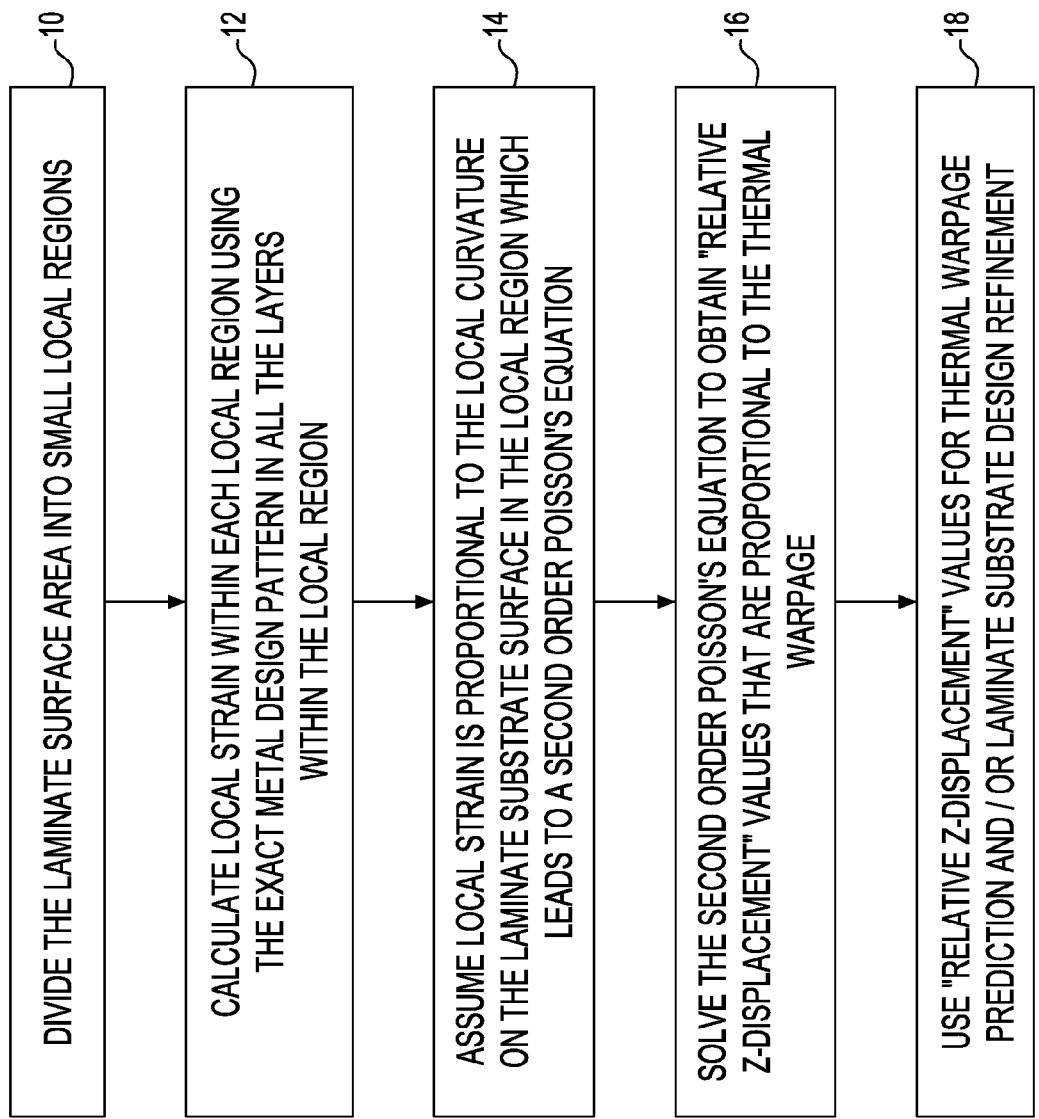
FIG. 1 is a flow chart illustrating the exemplary embodiments of laminate substrate thermal warpage prediction.

The method of the exemplary embodiments is illustrated in FIG. 1 and may be summarized into the following steps:

The laminate surface area is divided into several small local regions, step 10;

Local strain is calculated within each local region on the laminate surface area using the exact metal design pattern in all the laminate layers within the local region, step 12;

Local strain is assumed to be proportional to the local curvature on the laminate surface in the local region which leads to a second order Poisson's equation, step 14;

The second order Poisson's equation can be solved to obtain "relative z-displacement" values that are proportional to the thermal warpage, step 16; and These "relative z-displacement" values can be used for thermal warpage prediction and/or for laminate design refinement, step 18.

Figure 2:
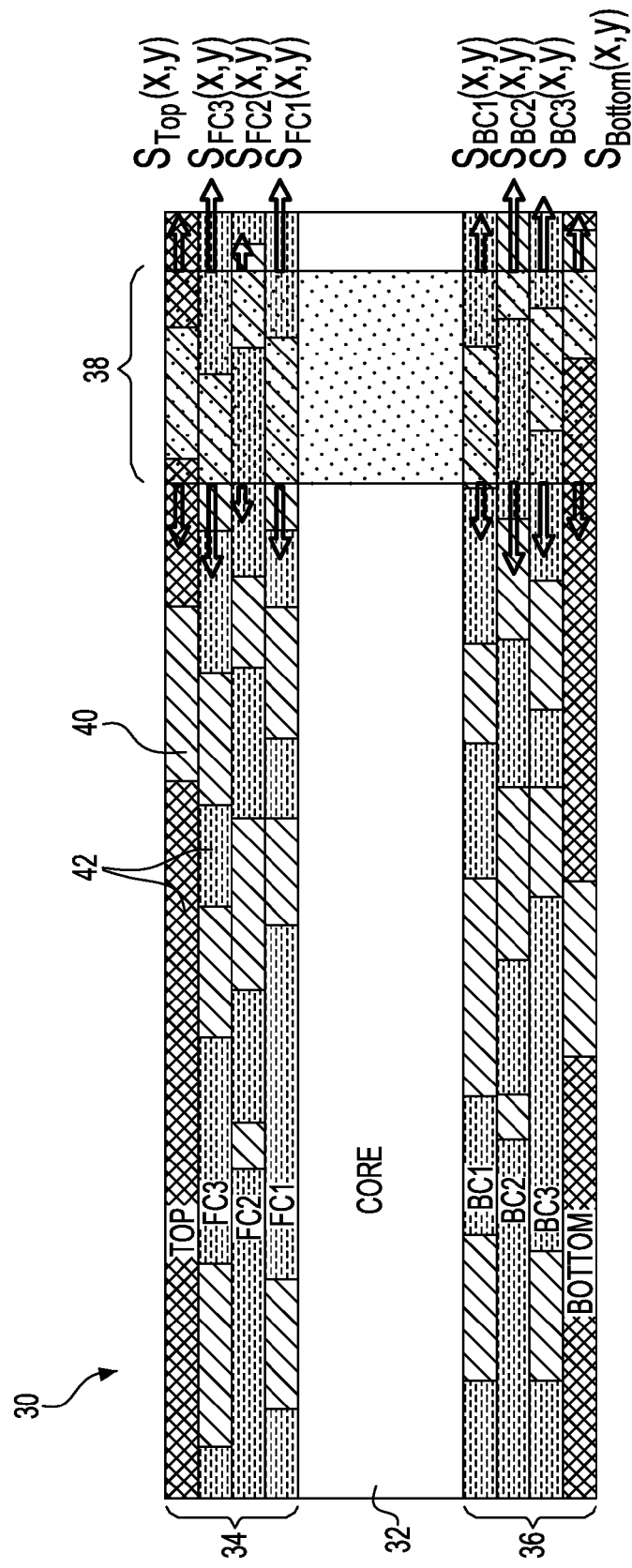
Figure 3:
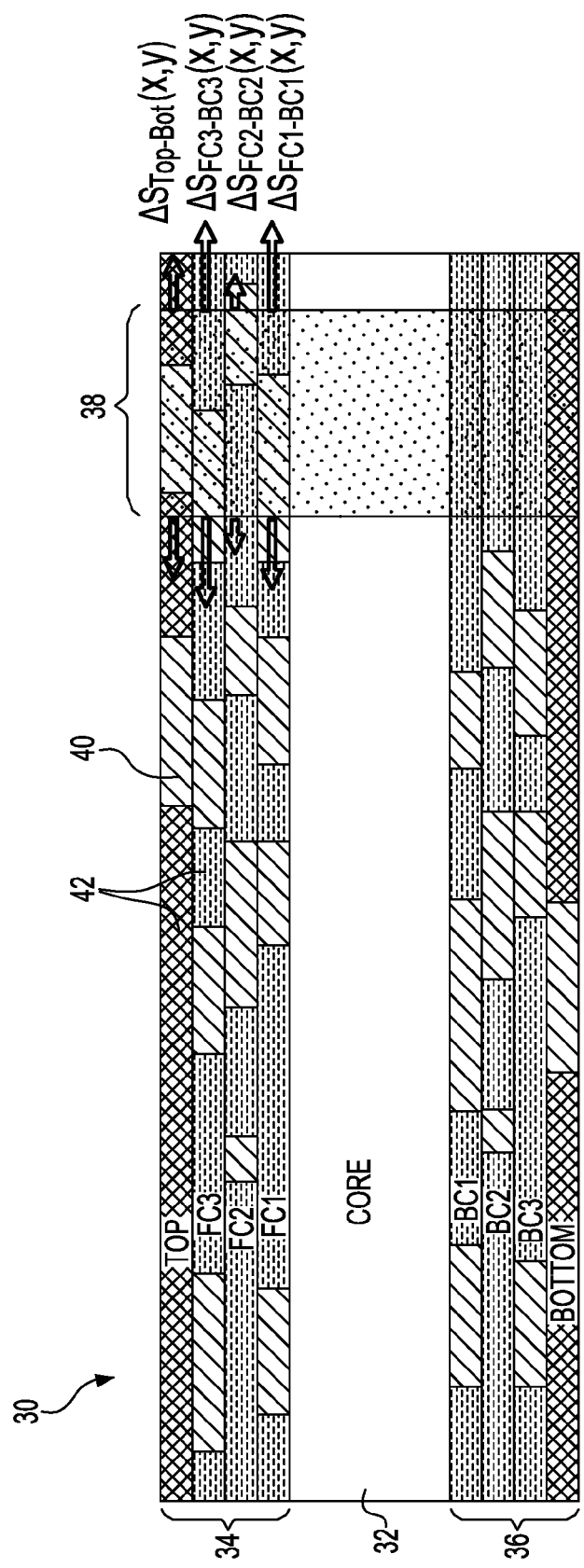
Figure 4:
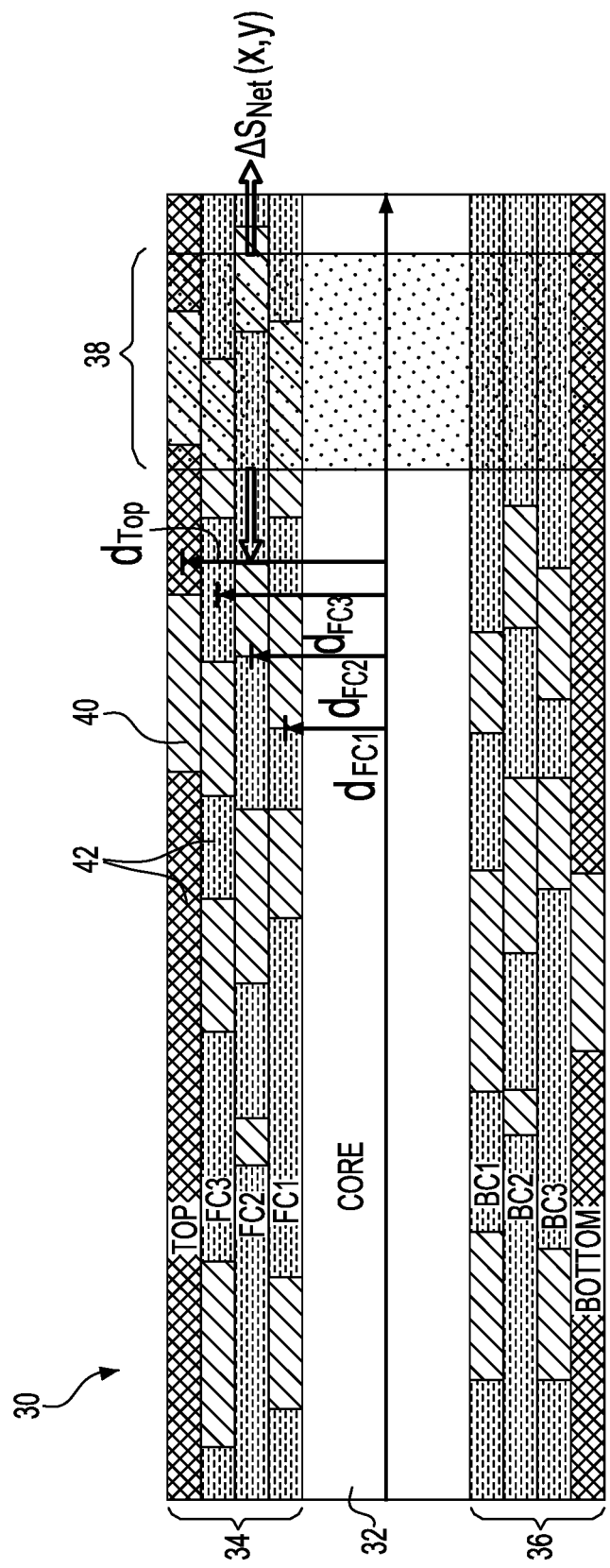

Referring now to FIGS. 2 to 4, the exemplary embodiments will be further illustrated with respect to a laminate substrate 30.

Laminate 30 as illustrated in FIGS. 2 to 4 is shown for purposes of illustration and not limitation. Laminate 30 has a core 32 which provides a rigid support for the laminate 30. Core 32 may also have through vias (not shown) which may connect the one or more of the upper laminate layers 34 to one or more of the lower laminate layers 36.

Upper laminate layers 34 and lower laminate layers 36 are the laminate layers that contain the vast majority of metallization. Metallized areas in the laminate layers may be indicated by the sectioning denoted by reference number 40 while nonmetallized in the laminate layer may be indicated by the sectioning denoted by reference number 42. In between the upper laminate layers 34 and between the lower laminate layers 36, there may be further dielectric layers having through vias. These further dielectric layers contain a relatively small amount of metallization compared to the upper laminate layers 34 and the lower laminate layers 36 and have a very small effect on the overall thermal warpage of the substrate laminate 30. Accordingly, these further layers may be ignored for the purposes of the exemplary embodiments and are not shown for clarity.

Core 32 may be made of one or more layers of nonmetallic material such as glass fibers in an epoxy matrix. The through vias through the core 32 are typically filled with a metallic or metal-containing materials. It should be understood that laminate 30 may typically have a core 32. In one exemplary embodiment, laminate 30 may not have a core of any type.

The upper laminate layers 34 are above the core 32 and may be labeled as FC1, FC2, FC3 and Top. The laminate layer labeled Top is where the chip and other components may be joined to the laminate substrate 30. There may be more or less than the three FC laminate layers shown in FIGS. 2 to 4.

The lower laminate layers 36 are below the core 32 and may be labeled as BC1, BC2, BC3 and Bottom. The laminate layer labeled Bottom is where the laminate substrate may be joined to another laminate substrate (not shown) using connections such as ball grid arrays or other connection means. There may be more or less than the three BC laminate layers shown in FIGS. 2 to 4.

In one exemplary embodiment, the core could have metallization for signal and power distribution. These layers, if present, may be called IP1, IP2, etc.

It should be understood that the nomenclature FC for the upper laminate layers 34, BC for the lower laminate layers 36 and IP for the core layers (if present) has no significance other than to identify the upper laminate layers 34, lower laminate layers 36 and core layers, respectively.

FIGS. 2 to 4 also illustrate a local region 38 which extends entirely through the laminate substrate 30 from the Top laminate layer to the Bottom laminate layer. The size of the local region 38 may be in the range of about 20 microns (μm) to about 2500 μm. The lower limit for the range could be as small as the line width and spacing based on laminate ground rules which is typically around 20 μm. The larger size is better for faster calculations but the smaller size is better for correlation with actual measurements of thermal warpage. In one exemplary embodiment, a range of 500μ to 625μ has been found to give good correlation with actual thermal warpage measurements.

When the laminate substrate 30 is heated such as during component assembly, stretching (or compression) occurs within each laminate layer in the local region 38. The amount of stretching (or compression) of each laminate layer within the local region 38 depends on the amount of metal present in these laminate layers.

For purposes of illustration and not limitation, copper is used to demonstrate the exemplary embodiments but other metals such as nickel or gold may also be used in the exemplary embodiments.

As noted above, the laminate substrate may undergo stretching or compression. In terms of simplifying the discussion, stretching or expansion of the laminate substrate 30 may be viewed as positive stretching while compression may be viewed as negative stretching. Hereafter, the use of "stretching" may include both positive stretching and negative stretching unless specifically stated otherwise.

If $S_{Layer}(x,y)$ indicates the amount of stretching within a given laminate layer at a local region x,y 38 on the laminate substrate, we have:

$$S_{layer}(x,y) = Ko[Cu_{Layer}(x,y)] \quad (1)$$

where Ko is a constant for a given size of local region 38 and $[Cu_{Layer}(x,y)]$ is the volume percent copper in the given laminate layer in the local region. The given laminate layer may be any of the FC1, FC2, FC3, Top, IP, BC1, BC2, BC3 and Bottom layers. $S_{Layer}$ is illustrated in FIG. 2.

The stretching in corresponding laminate layers above and below the core 32 can be netted to find the net stretching between each corresponding laminate layer pair. For example, the stretching can be netted for corresponding laminate layers FC1 and BC1. Referring now to FIG. 3, the netstretching for the corresponding laminate layers in the local region 38 is illustrated. Since there are four upper laminate layers 34 and four lower laminate layers 36 shown in the exemplary embodiment illustrated in FIGS. 2 to 4, the netstretching for each of the corresponding layers is $\Delta S_{Top-Bot}(x, y)$, $\Delta S_{FC3-BC3}(x, y)$, $\Delta S_{FC2-BC2}(x, y)$ and $\Delta S_{FC1-BC1}(x, y)$. The number of upper laminate layers 34 is generally equal to the number of lower laminate layers 36. Making the upper laminate layers 34 and lower laminate layers 36 equal in number is done to ensure that the warpage behavior is good. A preferred exemplary embodiment is applicable only for such symmetrically designed laminates.

A next step is to calculate the net stretching for the entire local region 38. Laminate layers further from the core 32 can exert more leverage and hence are given more weight than laminate layers closer to the core 32. The net stretching for the entire local region 38 can be computed as a weighted average of the net stretching between each corresponding laminate layer pair. Each corresponding laminate layer pair may be, for example, FC1 and BC1. The net stretching for the entire local region 38 may be expressed by the following equation:

$$\Delta S_{Net}(x, y) = \frac{\Sigma weights_i \times \Delta S_{Layer\ Pair_i}(x, y)}{\Sigma weights_i} \quad (2)$$

where $weights_i$ is proportional to (distance from the core center)$^2$ and i is from 1 to the number of corresponding laminate layer pairs, in this exemplary embodiment FC1-BC1 to Top-Bottom. FIG. 4 illustrates the net stretching $\Delta S_{Net}(x, y)$ for the entire local region 38. The distances from the center of the core 32 are shown as $d_{FC1}$, $d_{FC2}$, $d_{FC3}$ and $d_{Top}$. Since the distances between the center of the core 32 and the lower laminate layers 36 are the same as $d_{FC1}$, $d_{FC2}$, $d_{FC3}$ and $d_{Top}$, the distances $d_{FC1}$, $d_{FC2}$, $d_{FC3}$ and $d_{Top}$ actually represent the distances for the corresponding laminate layer pairs. The calculation for the weight for corresponding laminate layer pair FC1-BC1 may be computed according to the following equation:

$$\frac{(d_{FC1})^2}{d_{FC1}^2 + d_{FC2}^2 + d_{FC3}^2 + d_{Top}^2} \quad (3)$$

If the core has IP layers for metallization for signal and power distribution (as described above), equations 1 to 3 remain the same regardless of whether IP layers are present or not. The distance 'd' is still measured from the center of the core. The IP layers are present within the core which is very stiff and are also close to the core center thereby exerting very little leverage. Therefore, excluding the IP layers from equations 1 to 3 should not affect the predictability of the exemplary embodiments. Similar calculations may be done for corresponding laminate layer pairs FC-BC2, FC3-BC3 and Top-Bottom and their respective weights may be summed and inserted into the equation for $\Delta S_{Net}(x, y)$.

Local strain ($\varepsilon$) is the net stretching in the entire local region 38 divided by the size of the entire local region and so is proportional to $\Delta S_{Net}(x, y)$ according to the following equation:

$$\varepsilon xx = \varepsilon yy = K_1 \Delta S_{Net}(x,y) \quad (4)$$

where K1 is constant for a given size of local region.

Local strain is proportional to the mean local curvature as shown in the following equation:

$$\varepsilon_{xx}(x, y) = \varepsilon_{yy}(x, y) = \frac{K_2}{R(x, y)} \quad (5)$$

where R is the mean local curvature and $K_2$ depends on the material used for the laminate layers and the thicknesses of various laminate layers within the laminate (core and upper and lower laminate layers). For a given material set and thicknesses, $K_2$ is constant.

If z(x,y) is the out-of-plane displacement, the mean curvature at any location (x,y) is given by:

$$\frac{1}{R(x, y)} = \frac{\left(1+\left(\frac{\partial z}{\partial x}\right)^2\right)\frac{\partial^2 z}{\partial y^2} + \left(1+\left(\frac{\partial z}{\partial y}\right)^2\right)\frac{\partial^2 z}{\partial x^2} - 2\frac{\partial z}{\partial x}\frac{\partial z}{\partial y}\frac{\partial^2 z}{\partial x \partial y}}{2\left(1+\left(\frac{\partial z}{\partial x}\right)^2 + \left(\frac{\partial z}{\partial y}\right)^2\right)^{\frac{3}{2}}} \approx \frac{\frac{\partial^2 z}{\partial y^2} + \frac{\partial^2 z}{\partial x^2}}{2} \quad (6)$$

since first order partial derivatives can be neglected for plane warpage.

Combining equations 1, 2, 4, 5 and 6, the result is:

$$\frac{\partial^2 z}{\partial y^2} + \frac{\partial^2 z}{\partial x^2} \approx K\left(\frac{\sum_{i=1}^{\#Layers} weights_i \times \Delta Cu_{Layer\ Pair_i}(x, y)}{\sum_{i=1}^{\#Layers} weights_i}\right) \quad (7)$$

where, K is a constant for a given size of local region, laminate material and build-up and core laminate layer thicknesses. K is a combination of previous constants $K_0$, $K_1$ and $K_2$.

Equation 7 is a Poisson's equation. One way of solving a Poisson's equation is by discretizing the equation which then may be solved numerically.

The right hand term in brackets of equation 7 can be calculated from the copper design pattern in the laminate substrate 30. The constant K is unknown. However, if K is assumed as 1, the obtained solution z' will be proportional to the actual out-of-plane displacement z. Equation 7 can be re-casted to equation 8.

$$\frac{\partial^2 z'}{\partial y^2} + \frac{\partial^2 z'}{\partial x^2} \approx \left( \frac{\sum_{i=1}^{\#Layers} weights_i \times \Delta Cu_{Layer\ Pair}(x,y)}{\sum_{i=1}^{\#Layers} weights_i} \right) \quad (8)$$

z' is called the relative z-displacement at any location (x,y) and can then be used for warpage prediction for a given laminate material and build-up and core thicknesses.

Example Solution for Equation 8:

An example solution for equation 8 may be provided in which the second order Poisson equation is turned into a discrete Poisson equation by standard mathematics procedure.

The laminate substrate may be divided into "m" local regions in the x direction and "n" local regions in the y direction for a total of mn local regions.

$$\frac{\partial^2 z'}{\partial y^2} + \frac{\partial^2 z'}{\partial x^2} \approx \left( \frac{\sum_{i=1}^{\#Layers} weights_i \times \Delta Cu_{Layer\ Pair}(x,y)}{\sum_{i=1}^{\#Layers} weights_i} \right) = c \quad (8a)$$

The relative z' displacement can be evaluated as $\{z'\} = [A]^{-1} \{c\}$ where $\{z'\}$ and $\{c\}$ are the values at each location in an mn×1 size matrix and A is an mn×mn size matrix. z' contains the relative z-displacement values at a local region x and y where 1<x<m and 1<y<n. c is the right hand side of the equation 8a at a local region x and y where 1<x<m and 1<y<n. Matrix A has n×n cells where each cell is of m×m size and each cell is one of matrix I (identity matrix) or matrix D (given below) or 0 as given below.

$$A = \begin{bmatrix} D & -I & 0 & 0 & 0 & \cdots & 0 \\ -I & D & -I & 0 & 0 & \cdots & 0 \\ 0 & -I & D & -I & 0 & \cdots & 0 \\ \vdots & \vdots & \vdots & \vdots & \vdots & \ddots & \vdots \\ 0 & \cdots & 0 & -I & D & -I & 0 \\ 0 & \cdots & \cdots & 0 & -I & D & -I \\ 0 & \cdots & \cdots & \cdots & 0 & -I & D \end{bmatrix},$$

D, given below, and I may be inserted into matrix A.

$$D = \begin{bmatrix} 4 & -1 & 0 & 0 & 0 & \cdots & 0 \\ -1 & 4 & -1 & 0 & 0 & \cdots & 0 \\ 0 & -1 & 4 & -1 & 0 & \cdots & 0 \\ \vdots & \vdots & \vdots & \vdots & \vdots & \ddots & \vdots \\ 0 & \cdots & 0 & -1 & 4 & -1 & 0 \\ 0 & \cdots & \cdots & 0 & -1 & 4 & -1 \\ 0 & \cdots & \cdots & \cdots & 0 & -1 & 4 \end{bmatrix},$$

The A matrix may be solved by matrix multiplication. Once A is solved, c is determined at each mn location, then z' may be determined at each mn location.

A typical warpage profile may be bow shaped with the ends of the substrate laminate extending either upwardly or downwardly. In solving equation 8 for z', the equation would be solved at every location (x, y) on the substrate laminate 30. The plurality of z' values determined at every location (x, y) may be graphed for clarity. However, in one exemplary embodiment, a net z' displacement may be determined by subtracting the minimum z' displacement at any location (x, y) from the maximum z' displacement at any location (x, y) for the plurality of z' values. This net z' displacement may be used to predict the thermal warpage of a substrate laminate.

Thermal warpage for laminate substrates with different core thicknesses can be brought under equal footing by dividing the net relative z-displacement (z') by the core thickness. The resulting number is expected to be proportional to the measured warpage as long as the laminate material is held constant.

Residual stresses occur during laminate fabrication/cure shrinkage. The residual stresses could also affect the thermal warpage but how the residual stresses affect thermal warpage is unknown. Thermal warpage could exist even with zero copper imbalance. The effect of residual stresses is assumed to be constant for a given laminate material.

For a given laminate material, the measured thermal warpage can be related to the normalized z' in a linear form as given in equation 9:

$$\text{Measure Thermal Warpage} = A_0 + A_1 \frac{\text{net } z'}{(\text{Core Thickness})^3} \quad (9)$$

where $A_0$ and $A_1$ are constants.

As a practical matter, $A_0$, $A_1$ and net z' are all unknown for a new design of a laminate substrate. Accordingly, pre-existing data for Measured Thermal Warpage may be used to experimentally determine $A_0$ and $A_1$ from a previous design of a laminate substrate. Once $A_0$ and $A_1$ have been experimentally determined, net z' has been derived from equation 8 and the core thickness is known from the new laminate substrate design, then all of $A_0$, $A_1$, net z' and the core thickness may be inserted into equation 10 to solve for the predicted thermal warpage.

$$\text{Predicted Thermal Warpage} = A_0 + A_1 \frac{\text{net } z'}{(\text{Core Thickness})^3} \quad (10)$$

In the exemplary embodiment where there is a laminate 30 without a core, the core thickness may be set to "1" in the above equations 9 and 10. Coreless laminate pre-existing data should be used to experimentally determine $A_0$ and $A_1$ for use in the modified equations 9 and 10. In the exemplary embodiment where there is a laminate 30 with IP layers in the core, the core thickness should also include the thickness of the IP layers present within the core.

Figure 5:
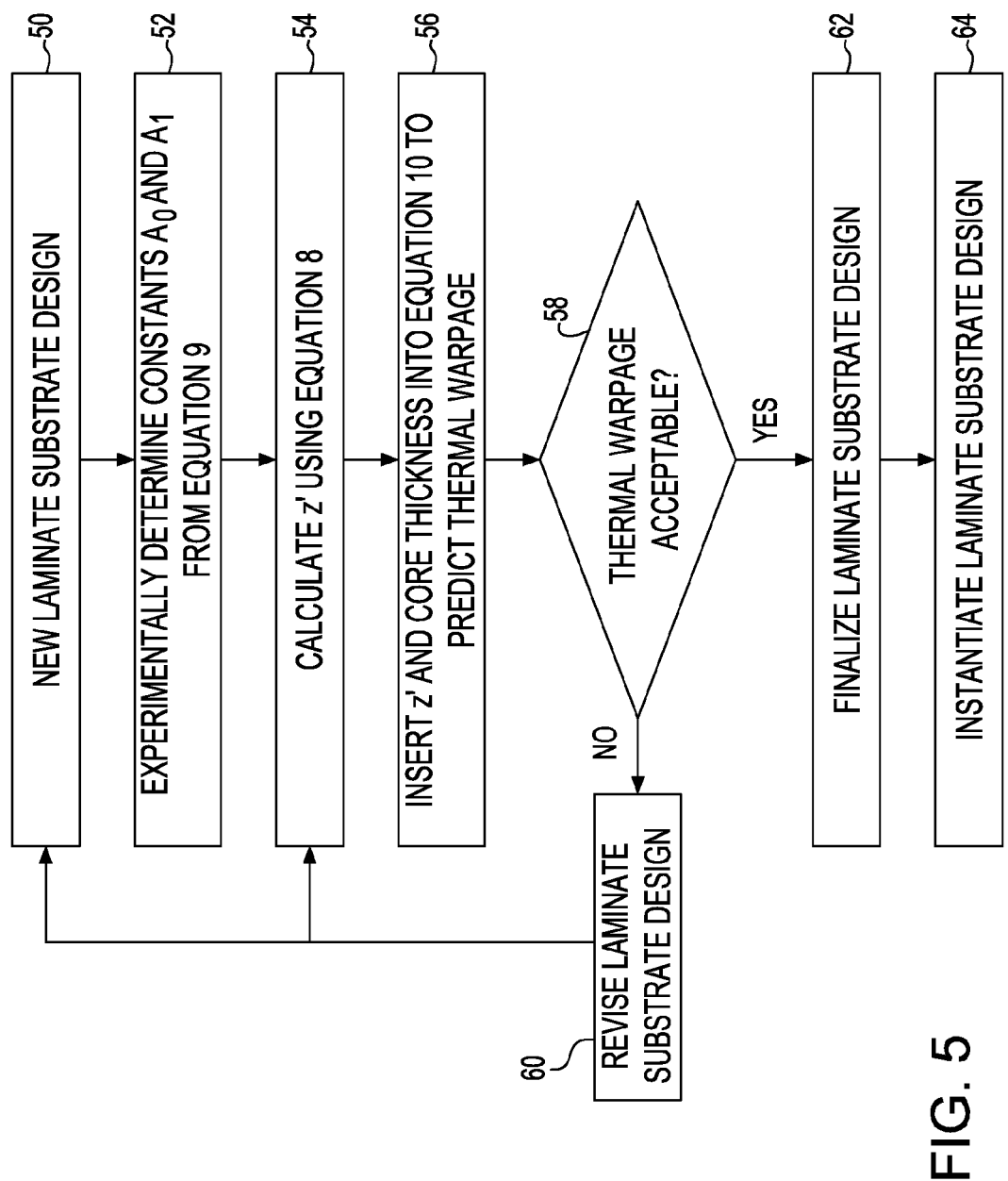
FIG. 5 is a flow chart illustrating the use of the exemplary embodiments in a process for designing a laminate substrate with acceptable thermal warpage.

A practical use of the exemplary embodiments is illustrated in FIG. 5. A new laminate substrate design is under consideration, step 50. It would be important to know the predicted thermal warpage of the new laminate substrate design before it is put into production.

The process of the exemplary embodiments would be followed to evaluate the predicted thermal warpage of the new laminate substrate design. The constants $A_0$ and $A_1$ from equation 9 would be experimentally determined, step 52. This step may have been done previously and if so, need not occur when a new laminate substrate design is considered.

The net relative z-displacement, z', may be calculated using equation 8, step 54.

The net relative z-displacement, z', and core thickness, along with the constants $A_0$ and $A_1$ can be inserted into equation 10 to predict the thermal warpage for the new laminate substrate design, 56.

In a next step, the predicted thermal warpage may be compared to a predetermined standard, step 58. The predetermined standard may be based on prior experience with thermal warpage and what amount of thermal warpage is considered acceptable for the laminate substrate designs under consideration.

If the predicted thermal warpage is unacceptable, the "NO" path is followed and the laminate substrate design may be revised, step 60. The revised laminate substrate design may then be inserted into the process as a new substrate design, step 50, and the revised laminate substrate design is then evaluated again. In one variant of the exemplary embodiments, after revising the laminate substrate design, the process may proceed to recalculate the net relative z-displacement, z', step 54.

If the predicted thermal warpage is acceptable, the "YES" path is followed and the laminate substrate design is finalized, step 62. Step 62 is to denote a decision that a laminate designer has accepted the laminate design and the laminate design is then sent for fabrication.

Then, the acceptable laminate substrate design may be instantiated or implemented into production by manufacturing laminate substrates having the design features evaluated in the foregoing process, step 64.

The exemplary embodiments are directed to a unique method to predict thermal warpage in laminate substrates, including the chip site area and the full laminate area using metal design pattern information alone for a given laminate material. The exemplary embodiments are not dependent on material property assumptions or knowing any material property information.

Thermal warpage can be predicted very quickly (<1 minute for modern laminate substrate designs) compared to days for other prior methods.

The exemplary embodiments may be used by laminate designers easily without needing to have knowledge regarding mechanical modeling.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method of designing a laminate substrate having a core, a plurality of laminate layers above the core and a plurality of laminate layers below the core, the method comprising:

dividing the laminate substrate into a plurality of regions, each region having a plurality of corresponding laminate layer pairs consisting of a laminate layer above the core and a laminate layer below the core;

calculating a net stretching value for each corresponding laminate layer pair in each region to result in a plurality of net stretching values in each region;

summing the plurality of net stretching values in each region to result in a net stretching value for each region wherein the net stretching value in each region is proportional to a curvature of each local region;

calculating a relative out-of-plane displacement for the laminate substrate from the curvature of each local region;

calculating a predicted thermal warpage for the laminate substrate such that the predicted thermal warpage is proportional to the relative out-of-plane displacement divided by a thickness of the core raised to an exponent; and finalizing a design of the laminate substrate when the predicted thermal warpage is within a predetermined acceptable range.

2. The computer-implemented method of claim 1 further comprising instantiating the design of the laminate substrate into a physical laminate substrate.

3. The computer-implemented method of claim 1 further comprising revising the design of the laminate substrate when the predicted thermal warpage is not within the predetermined acceptable range followed by:

calculating a predicted thermal warpage for the laminate substrate such that the predicted thermal warpage is proportional to the relative out-of-plane displacement divided by the thickness of the core raised to an exponent; and finalizing the design of the laminate substrate when the predicted thermal warpage is within the predetermined acceptable range.

4. The computer-implemented method of claim 1 wherein the laminate substrate includes a chip site and the predicted thermal warpage is applicable to the entire laminate substrate including the chip site.

5. The computer implemented method of claim 1 wherein the net stretching value in each region is calculated according to the equation $$\Delta S_{Net}(x, y) = \frac{\Sigma weights_i \times \Delta S_{Layer\ Pair_i}(x, y)}{\Sigma weights_i}$$

where $\Delta S_{Layer\ Pair_i\ (x,y)}$ is a difference in stretching between a layer above the core and a corresponding layer below the core and the $weights_i$ is a value proportional to a squared distance of a $layer_i$ from a center of the core where i is from 1 to the number of corresponding laminate layer pairs.

6. The computer implemented method of claim 1 wherein the relative out-of-plane displacement, z', is calculated according to the equation $$\frac{\partial^2 z'}{\partial y^2} + \frac{\partial^2 z'}{\partial x^2} \approx \left( \frac{\sum_{i=1}^{\#Layers} weights_i \times Metal_{Layer\ Pair}(x, y)}{\sum_{i=1}^{\#Layers} weights_i} \right)$$

where z' is the relative out-of-plane displacement, the weights$_i$ is a value proportional to a squared distance of a layer$_i$ from a center of the core and $\Delta \text{Metal}_{Layer\ Pair_i}$ is a difference in metal content between corresponding layer pairs at each location (x, y) where i is from 1 to the number of corresponding laminate layer pairs.

7. The computer-implemented method of claim 6 wherein the predicted thermal warpage is calculated according to the equation $$\text{Predicted Thermal Warpage} = A_0 + A_1 \frac{\text{net } z'}{(\text{Core Thickness})^3}$$

where $A_0$ and $A_1$ are experimentally determined constants and core thickness is a thickness of the core and net z' is the difference between a maximum z' at any location (x, y) and a minimum z' at any location (x, y) for the plurality of z' values.

8. The computer-implemented method of claim 1 wherein the corresponding layer pair comprises a first layer above the core and spaced from a distance from the core by a distance D1 and a second layer below the core and spaced from the core by a distance D2 such that D1=D2.

9. A computer-implemented method of designing a laminate substrate having a plurality of upper laminate layers and an equal plurality of lower laminate layers, the method comprising:
  dividing the laminate substrate into a plurality of regions, each region having a plurality of corresponding laminate layer pairs consisting of an upper laminate layer and a lower laminate layer;
  calculating a net stretching value for each corresponding laminate layer pair in each region to result in a plurality of net stretching values in each region;
  summing the plurality of net stretching values in each region to result in a net stretching value for each region wherein the net stretching value in each region is proportional to a curvature of each local region;
  calculating a relative out-of-plane displacement for the laminate substrate from the curvature of each local region;
  calculating a predicted thermal warpage for the laminate substrate such that the predicted thermal warpage is proportional to the relative out-of-plane displacement divided by a thickness of a core raised to an exponent wherein the core is optional and when the core is not present, then the number 1 is substituted for the thickness of the core; and
  finalizing a design of the laminate substrate when the predicted thermal warpage is within a predetermined acceptable range.

10. The computer-implemented method of claim 9 further comprising revising the design of the laminate substrate when the predicted thermal warpage is not within the predetermined acceptable range followed by:
  calculating a predicted thermal warpage for the laminate substrate such that the predicted thermal warpage is proportional to the relative out-of-plane displacement divided by the thickness of the core raised to an exponent wherein the core is optional and when the core is not present, then the number 1 is substituted for the thickness of the core; and
  finalizing the design of the laminate substrate when the predicted thermal warpage is within the predetermined acceptable range.

11. The computer-implemented method of claim 9 further comprising instantiating the design of the laminate substrate into a physical laminate substrate.

12. The computer-implemented method of claim 9 wherein the laminate substrate includes a chip site and the predicted thermal warpage is applicable to the entire laminate substrate including the chip site.

13. The computer implemented method of claim 9 wherein the net stretching value in each region is calculated according to the equation $$\Delta S_{Net}(x, y) = \frac{\Sigma \text{weights}_i \times \Delta S_{Layer\ Pair_i}(x, y)}{\Sigma \text{weights}_i}$$

where $\Delta S_{Layer\ Pair_i\ (x,y)}$ is a difference in stretching between an upper layer and a corresponding lower layer and the weights$_i$ is a value proportional to a squared distance of a layer$_i$ from a center of the laminate substrate where i is from 1 to the number of corresponding laminate layer pairs.

14. The computer implemented method of claim 9 wherein the relative out-of-plane displacement, z', is calculated according to the equation $$\frac{\partial^2 z'}{\partial y^2} + \frac{\partial^2 z'}{\partial x^2} \approx \left( \frac{\sum_{i=1}^{\#Layers} \text{weights}_i \times \text{Metal}_{Layer\ Pair}(x, y)}{\sum_{i=1}^{\#Layers} \text{weights}_i} \right)$$

where z' is the relative out-of-plane displacement, the weights$_i$ is a value proportional to a squared distance of a layer$_i$ from a center of the laminate substrate and $\Delta \text{Metal}_{Layer\ Pair_i}$ is a difference in metal content between corresponding layer pairs at each location (x, y) where i is from 1 to the number of corresponding laminate layer pairs.

15. The computer-implemented method of claim 14 wherein the predicted thermal warpage is calculated according to the equation $$\text{Predicted Thermal Warpage} = A_0 + A_1 \frac{\text{net } z'}{(\text{Core Thickness})^3}$$

where $A_0$ and $A_1$ are experimentally determined constants and core thickness is a thickness of the core and net z' is the difference between a maximum z' at any location (x, y) and a minimum z' at any location (x, y) for the plurality of z' values.

16. The computer-implemented method of claim 9 wherein the corresponding layer pair comprises a first upper layer spaced by a distance from a center of the laminate substrate by a distance D1 and a second lower layer spaced by a distance from a center of the laminate substrate by a distance D2 such that D1=D2.

17. A computer program product for designing a laminate substrate having a plurality of upper laminate layers and an equal plurality of lower laminate layers, the computer program product comprising a computer readable storage medium having program instructions embodied therewith, the program instructions executable by a processor to cause the processor to perform a method comprising:
  dividing the laminate substrate into a plurality of regions, each region having a plurality of corresponding laminate layer pairs consisting of an upper laminate layer and a lower laminate layer;

calculating a net stretching value for each corresponding laminate layer pair in each region to result in a plurality of net stretching values in each region;

summing the plurality of net stretching values in each region to result in a net stretching value for each region wherein the net stretching value in each region is proportional to a curvature of each local region;

calculating a relative out-of-plane displacement for the laminate substrate from the curvature of each local region;

calculating a predicted thermal warpage for the laminate substrate such that the predicted thermal warpage is proportional to the relative out-of-plane displacement divided by a thickness of a core raised to an exponent wherein the core is optional and when the core is not present, then the number 1 is substituted for the thickness of the core; and finalizing a design of the laminate substrate when the predicted thermal warpage is within a predetermined acceptable range.

18. The computer program product of claim 17 further comprising revising the design of the laminate substrate when the predicted thermal warpage is not within the predetermined acceptable range followed by:

calculating a predicted thermal warpage for the laminate substrate such that the predicted thermal warpage is proportional to the relative out-of-plane displacement divided by the thickness of the core raised to an exponent wherein the core is optional and when the core is not present, then the number 1 is substituted for the thickness of the core; and finalizing the design of the laminate substrate when the predicted thermal warpage is within the predetermined acceptable range.

19. The computer program product of claim 17 further comprising instantiating the design of the laminate substrate into a physical laminate substrate.

20. The computer program product of claim 17 wherein the corresponding layer pair comprises a first upper layer spaced by a distance from a center of the laminate substrate by a distance D1 and a second lower layer spaced by a distance from a center of the laminate substrate by a distance D2 such that D1=D2.

\* \* \* \* \*